United States Patent [19]

Rolandelli

[11] 4,251,100
[45] Feb. 17, 1981

[54] ADJUSTABLE SAFETY SEAT FOR AMBULANCES AND OTHER EMERGENCY VEHICLES

[76] Inventor: Paul J. Rolandelli, 405 W. 38th St., Wilmington, Del. 19802

[21] Appl. No.: 38,080

[22] Filed: May 11, 1979

[51] Int. Cl.³ .............................................. B60N 1/00
[52] U.S. Cl. ..................................... 296/63; 280/801; 297/464
[58] Field of Search ............... 297/195, 488, 338, 464, 297/354, 468, 487; 296/63, 64, 65 R, 65 A; 280/801, 802

[56] References Cited

U.S. PATENT DOCUMENTS

| 2,619,157 | 11/1952 | Guyton et al. | 297/464 X |
| 3,203,732 | 8/1965 | Hoffman | 297/338 X |

FOREIGN PATENT DOCUMENTS 1161879  9/1958  France ........................................ 296/63

Primary Examiner—John J. Love
Assistant Examiner—Norman L. Stack
Attorney, Agent, or Firm—LeBlanc, Nolan, Shur & Nies

[57] ABSTRACT

An adjustable safety seat is provided to enhance the ability of medical attendants to perform emergency medical services on a patient in a moving ambulance or other emergency vehicle. An adjustable seat, backrest and restraint for use with center-mounted cots in an emergency vehicle enable one medical attendant to perform, without interruption, the chest compressions and ventilations required for cardiopulmonary resuscitation, while simultaneously protecting the attendant from falls and possible injury when the vehicle is in motion. The adjustable safety seat enables the attendant to assume the optimal position for performing cardiopulmonary resuscitation. When not required for cardiopulmonary resuscitation, the seat can be adjusted to facilitate performance of other medical services on the patient.

17 Claims, 4 Drawing Figures

ADJUSTABLE SAFETY SEAT FOR AMBULANCES AND OTHER EMERGENCY VEHICLES

The present invention relates to an adjustable safety seat for emergency vehicles and, more particularly, to an adjustable safety seat adapted for installation in an ambulance or other emergency vehicle to enable medical attendants to safely perform emergency medical services on a patient while the vehicle is in motion. Specifically, this invention relates to an adjustable safety seat for ambulances and other emergency vehicles which serves as a restraint to securely hold an emergency medical technician in a position at the side of a patient on a stretcher to enable the technician to effectively perform cardiopulmonary resuscitation on the patient and to protect the technician against accidental injury while the vehicle is in motion.

Under modern standards for emergency medical services, the practice of stabilizing a patient before transport in an ambulance or other emergency vehicle has been adopted as the policy for ambulance crews. Yet, regardless of the level of personnel training and the sophistication of the emergency equipment, transports of patients in full arrest frequently occur. Conventional emergency vehicles appear poorly designed to enable effective cardiopulmonary resuscitation (CPR) to be performed while the vehicles are in motion.

Manual CPR in a moving ambulance or other emergency vehicle is difficult to perform. Any abrupt movement of the vehicle will often not only result in an interruption of life-maintaining CPR, but also can subject the emergency medical technician to a hazardous fall and possible injury. Typically, an overhead grab bar is provided in such vehicles for use by the emergency medical technician to maintain his balance. However, when the emergency medical technician needs to grasp the bar, his effectiveness in performing CPR is drastically diminished and often completely interrupted. Thus, there is a critical need for improvements in the interior design of emergency vehicles to enable basic life support services such as cardiopulmonary resuscitation to be performed more effectively with minimal risk of injury to emergency medical technicians.

Federal Specification KKK-A-1822, issued by the General Services Adminstration on Jan. 2, 1974 and later amended on June 25, 1975, prescribe the minimum standards for interior ambulance design. The GSA specifications require all ambulances to have an 18-inch aisle between the patient cot and squad bench except on Type II vans which must have a 12-inch aisle. The specifications also require a width of at least 25 inches of kneeling space for the emergency medical technician along the side of the patient cot. Obviously, it has been assumed that emergency medical technicians will perform CPR while kneeling in the aisle. This assumption is verified by a report entitled "Medical Requirements For Ambulance Design And Equipment", prepared under contract PH 110-68-1 with the Department of Health, Education and Welfare, which recognizes that the minimum space between the litters must be 25 inches to provide room for the operator to kneel while performing external cardiac compression and other functions. However, because of the height of a standard cot, typically about 15.5 inches in its lowered position, it is virtually impossible for an emergency medical technician to have the necessary leverage and proper positioning of his shoulders over the patient's sternum while in a kneeling position.

In actuality, few emergency medical technicians kneel when performing CPR in an ambulance or other emergency vehicle. Most technicians use some type of crouch, standing in the aisle with their shins against the cot and feet spaced apart by about 36 inches with their shoulders directly over the patient's sternum. The technicians keep their elbows straight and apply pressure vertically downward as recommended by the American Heart Association. Effective CPR can be performed in this position. However, since the emergency medical technician himself is not supported, any abrupt movement of the vehicle tends to interrupt the CPR and cause falls and possible injuries to the technician. Interruption of the CPR can result in unnecessary deaths of patients. Consequently, failure to support the emergency medical technician in a secure position from which effective uninterrupted CPR can be performed is a severe problem.

The present invention recognizes the need for an improved working environment for the patient compartment of an ambulance or other emergency vehicle with regard to the type of tasks to be performed. Accordingly, a primary objective of the invention is to improve the ability of emergency medical technicians to effectively and safely perform both basic life support services and advanced life support services while the vehicle is in motion. There is no sound reason for emergency medical technicians, who are transporting an emergency patient, to have to move about unsecured in the patient compartment during motion of the vehicle. Equipment necessary for handling life-threatening emergencies should be stored within easy reach of the emergency medical technician's seat which, in turn, should be within easy reach of the patient. The seats in the patient compartment should be designed to enable the emergency medical technicians to effectively employ their training and equipment without constantly spending considerable effort simply to maintain their own positions near the patient. The present reliance on an overhead grab bar only serves to underline the apparent deficiency in the interior design of ambulances without sufficient thought to the safety and needs of the emergency medical technicians. The ability to perform tasks with both hands is not only desirable, it is often imperative.

Frequently, ambulances and other emergency vehicles operate with only one emergency medical technician in the patient compartment during transport. Consequently, the position of the emergency medical technician in relation to the patient determines how effectively a task can be performed, if it can be performed at all. Ambulance design should take in to consideration the tasks required to be performed by the emergency medical technician to determine his position in relation to the patient. Preferably, the ambulance interior should be designed to secure and protect the emergency medical technician while allowing him to do both the ventilations and compressions necessary to perform CPR under the American Heart Association standards.

From his location, the emergency medical technician, while still protected in his seat, must be able to reach the controls for the oxygen, suction, lights, vents, inter-com and/or radio. Also, any other equipment needed en route, such as oxygen tubing, bag masks, catheters, dressings and bandages must be readily accessible. The same design should also provide a safe and effective working place for as many as three technicians simultaneously working on the patient.

The present invention contemplates an adjustable safety seat specially designed for use in the patient compartment of an ambulance or other emergency vehicle to support the emergency medical technician in the most effective position to perform emergency medical services on the patient and to securely hold the technician against the seat to prevent accidental injury while the vehicle is in motion. Preferably, the adjustable seat is mounted along an interior wall of the ambulance adjacent to a center-mount cot to allow the emergency medical technician to perform basic life support services from the right side of the patient. The seat is designed to allow one emergency medical technician to perform both the compressions and mouth-to-mouth ventilations required for effective CPR while securely held on the seat. Alternatively, a second emergency medical technician can ventilate the patient from the head of the cot using a bag mask. Additional emergency medical technicians can perform advanced life support services from the left side of the patient.

In accordance with the invention, an adjustable safety seat for use by a medical attendant in an emergency vehicle comprises a set of spaced vertical support members, a seat member extending horizontally between said support members and movably mounted thereon for adjustment between different vertical positions, means for locking the seat member on the support members in its different vertical positions, and restraining means for securely holding the medical attendant against the seat member during motion of the vehicle to permit him to safely perform emergency medical services on a patient.

The adjustable seat allows the medical attendant to assume the recommended position next to the patient to perform cardiopulmonary resuscitation. The seat member is adjustable to a height suitable to support the attendant in a crouch with his knees bent and his buttocks at rest on the seat member and with his arms and elbows straight and his hands on the chest of the patient to permit the attendant to safely and effectively perform the required chest compressions and ventilations for cardiopulmonary resuscitation.

Preferably, a backrest is mounted behind and extends above the seat member to protect the attendant from injury while the vehicle is in motion. The seat member is elongated and cylindrical in configuration and padded to provide comfortable support and protection. The restraining means comprises a safety belt adapted to securely hold the attendant against the seat member.

A preferred embodiment of the adjustable safety seat comprises a pair of vertical support bars mounted adjacent to an interior wall in the patient compartment of the emergency vehicle, a seat member extending horizontally between the support bars and slidably mounted thereon for adjustment between different vertical positions, means for locking the seat member on the support bars in its different vertical positions, and restraining means for securely holding the medical attendant against the seat member to permit him to safely perform emergency medical services on the patient while the vehicle is in motion.

Preferably, the seat member includes a pair of sleeve elements mounted at its opposite ends and adapted to slidably receive the support bars. Each support bar may include upper and lower arms secured to the interior wall of the ambulance. Alternatively, each support bar may have its lower end secured to the floor in the patient compartment of the vehicle and an upper arm fastened to the interior wall of the vehicle.

The preferred embodiment may also include an adjustable backrest mounted on the interior wall of the vehicle and extending above the seat member to protect the medical attendant from injury during motion of the vehicle. Preferably, the backrest is pivotally mounted on the interior wall of the vehicle and is adjustable between different angular positions.

Accordingly, it is a primary object of this invention to provide an adjustable safety seat for an ambulance or other emergency vehicle which enables a medical attendant to safely and effectively perform all necessary emergency medical services on a patient while the vehicle is in motion.

It is also an object of the invention to provide a safety seat which is readily adjustable in height to comfortably accommodate attendants of different height in the optimal position to perform cardiopulmonary resuscitation.

Another object of the invention is to provide an adjustable safety seat for an emergency vehicle specifically designed to enable emergency medical technicians to safely and effectively perform cardiopulmonary resuscitation on a patient without interruption by abrupt movement of the vehicle.

It is another object of the invention to provide an improved interior design for ambulances and other emergency vehicles to allow basic life support services and advanced life support services to be simultaneously performed on a patient by emergency medical technicians.

A further object of the invention is to provide an adjustable safety seat including a backrest and restraint for use with the center-mounted cots in an emergency vehicle to enable one person to perform, without interruptions, the chest compressions and ventilations required for cardiopulmonary resuscitation while simultaneously protecting the person from falls and possible injury during motion of the vehicle.

These and other objects will be readily apparent with reference to the drawings and the following description wherein.

Figure 1:
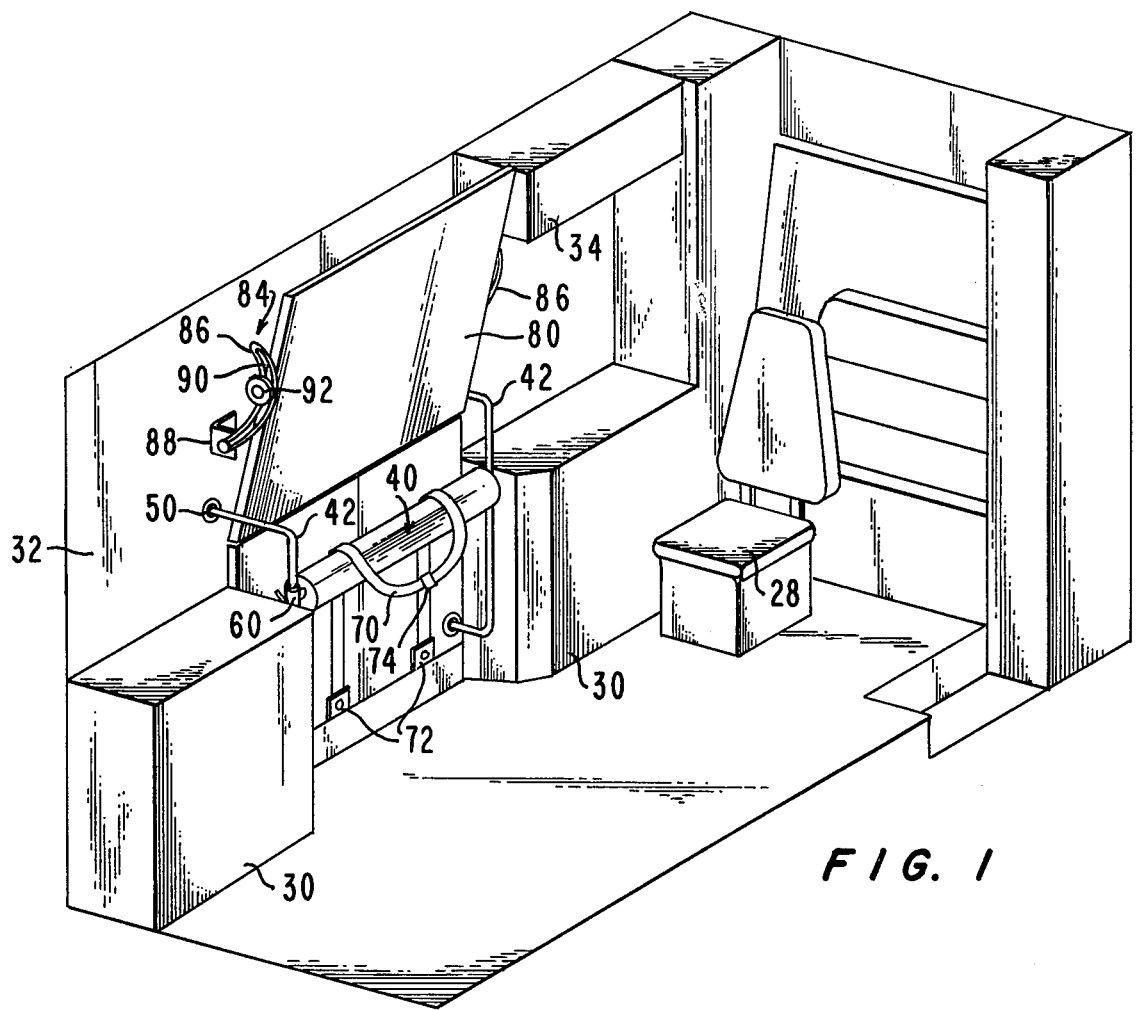
FIG. 1 is a perspective view illustrating an improved interior design for the patient compartment of an ambulance or other emergency vehicle including an adjustable safety seat embodying the principles of the present invention.
Figure 2:
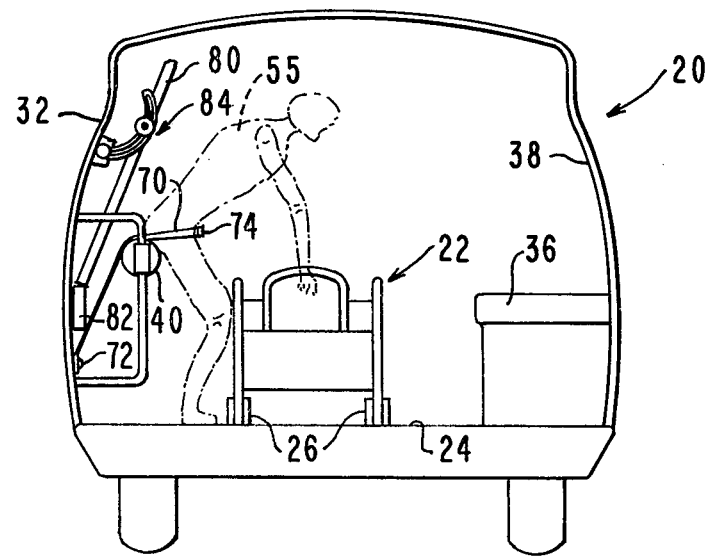
FIG. 2 is a rear view of an emergency vehicle illustrating the adjustable safety seat in use by an emergency medical technician in performing cardiopulmonary resuscitation on a patient.

Referring to FIGS. 1 and 2, the patient compartment of an ambulance or other emergency vehicle, generally 20, is designed to receive a center-mount cot 22 on which a patient (not shown) rests in a supine position. Patient cot 22 is latched in a fixed position on floor 24 of the ambulance by a set of latching devices 26. A chair 28 is provided in the patient compartment at the head of the patient cot. A set of storage cabinets 30 is provided on left interior wall 32 of the ambulance along with an overhead storage cabinet 34. A squad bench 36 is mounted along right interior wall 38 of the ambulance.

Figure 3:
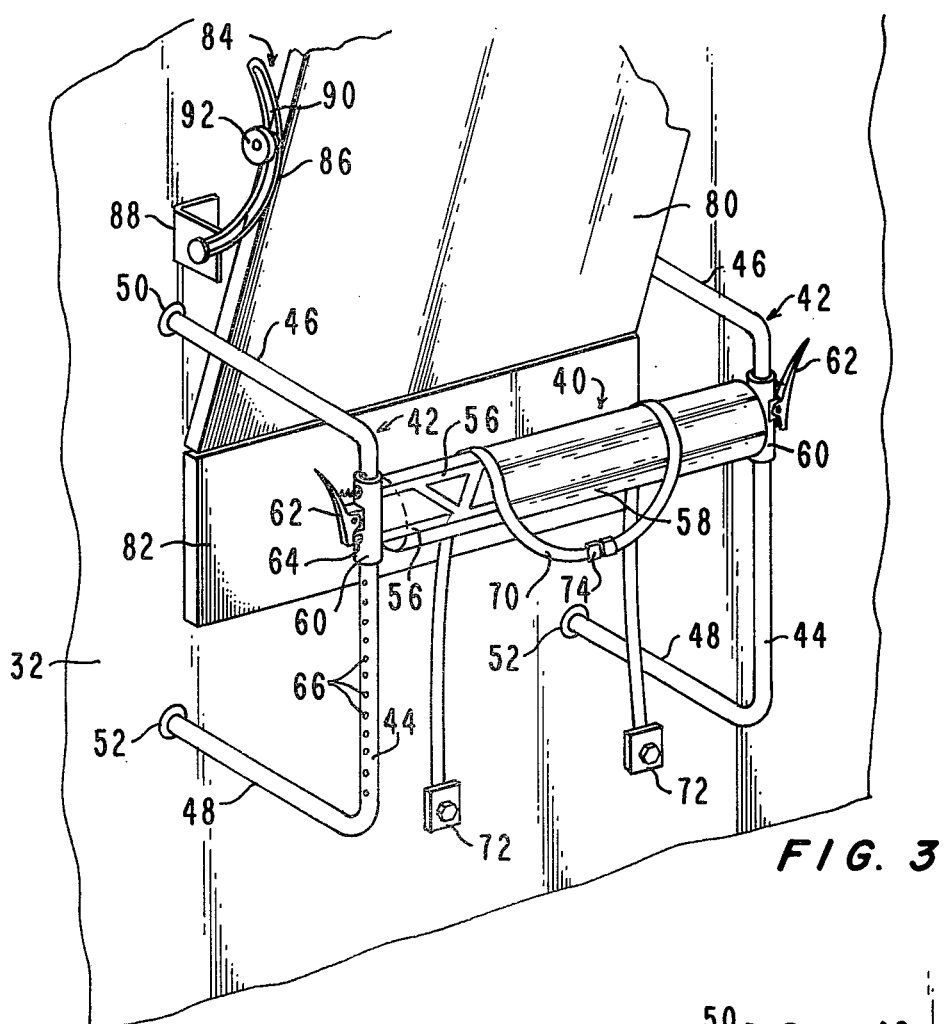
FIG. 3 is an enlarged perspective view of one embodiment of the adjustable safety seat.

An adjustable safety seat, generally 40, is mounted adjacent to left interior wall 32 of the patient compartment on a pair of spaced vertical support bars 42. As shown in FIG. 3, each support bar 42 includes an elongated vertical section 44 and upper and lower arms 46 and 48, respectively, extending horizontally therefrom. Upper arm 46 and lower arm 48 of each support bar are secured to ambulance wall 32 by flanges 50 and 52, respectively.

Figure 4:
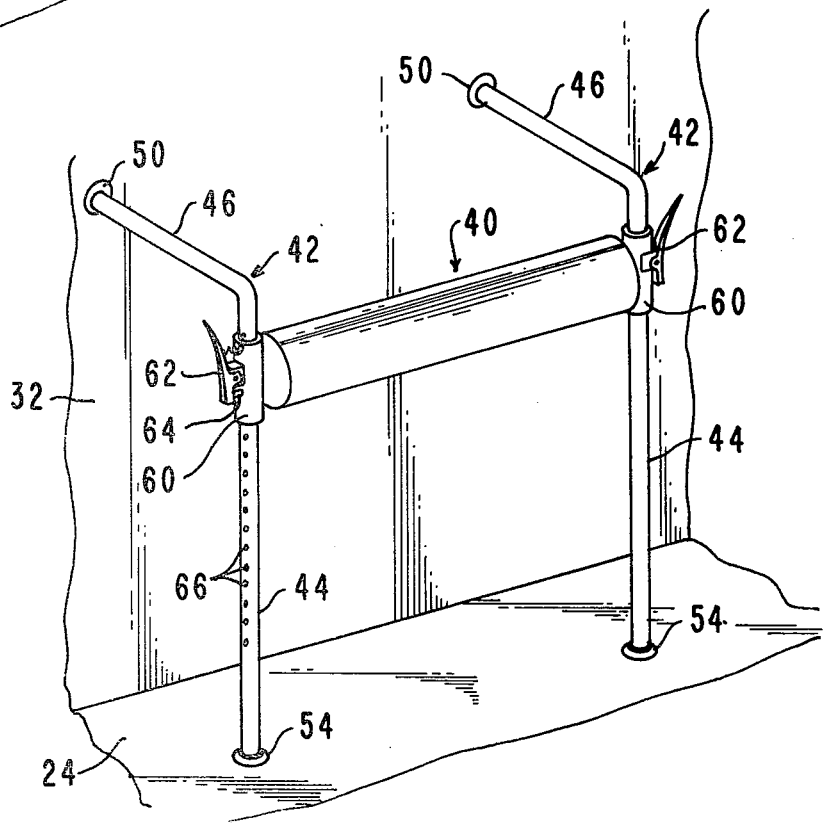
FIG. 4 is an enlarged perspective view of another embodiment of the adjustable safety seat.

Alternatively, as shown in FIG. 4, each support bar 42 has its upper arm 46 fastened to ambulance wall 32 by flange 50 while the lower end of upright section 44 is fastened to ambulance floor 24 by a flange 54. Otherwise, the safety seat construction shown in FIGS. 3 and 4 are identical.

Seat member 40 comprises a set of braced seat bars 56 over which a padded, cylindrical cover 58 is provided. Preferably, the padded cover consists of polyurethane foam interlaid with a layer of flame retardant material and overlaid with a covering of fire retardant, washable, non-absorbant, artificial leather or vinyl. Alternatively, seat member 40 may be rigid in construction, without padding, and angled, formed or pivoted to support an emergency medical technician 55 (FIG. 2) with his back straight and knees bent.

A pair of cylindrical sleeves or guideways 60 is provided at the opposite ends of seat bars 56 and slidably received on vertical sections 44 of support bars 42. Each guideway or sleeve 60 has a vertical bore which enables it to move smoothly up and down upright sections 44 of the support bars. Bushings or bearings (not shown) may be used, if desired, to facilitate smooth sliding movement.

The height of seat 40 above the ambulance floors is adjustable by sliding guideways 60 up or down vertical portions 44 of support bars 42. A quick release latch 62 is provided on each sleeve 60 to lock seat member 40 in different vertical positions on the support bars. Each latch 62 comprises a spring-biased handle pivotally mounted on sleeve 60 and provided with a locking pin 64 which is slidable through an aperture provided in the sleeve into engagement with a series of holes 66 spaced vertically along upright section 44 of each support bar. Alternatively, an infinitely adjustable latch may be provided, e.g., a set of multiple steel rings (not shown) which are freely slidable on support bars 42 until cocked into locking engagement with the support bars.

In the preferred embodiment, seat member 40 is located approximately 21 inches from the head to foot center line of patient cot 22. The seat extends parallel to the cot from a point opposite the head toward the feet, preferably between 36 inches and 48 inches in length. Seat member 40 is approximately 4 to 6 inches in depth and adjustable in height between 18 inches and 36 inches above the ambulance floor. Preferably, holes 66 are provided in vertical support bars 42 which are at 1-inch intervals from 18 to 36 inches above the floor.

The safety seat includes a restraint or safety belt 70 to securely hold an emergency medical technician against seat member 40 while the ambulance is in motion. Preferably, the opposite ends of safety belt 70 are secured by a pair of fasteners 72 to ambulance wall 32 at a level below seat member 40. The belt sections are looped over seat member 40 and joined by a buckle 74 across the pelvis of the emergency medical technician.

The adjustable safety seat is also provided with a backrest 80, preferably padded, mounted behind and extending above the seat member to protect the emergency medical technician against injury while the ambulance is in motion. As shown in FIGS. 1 and 2, backrest 80, comprising a large rectangular padded sheet, is pivotally mounted, e.g., by one or more hinges (not shown) on an elongated support member 82 secured to interior ambulance wall 32. Backrest 80 extends upwardly toward the ceiling of the ambulance to protect the back, neck and head of the technician against injury if he is thrown against it. The backrest is designed to prevent the technician from falling backwards beyond the point of recovery as the ambulance turns corners.

Backrest 80 is adjustable between different angular positions relative to ambulance wall 32. The backrest is preferably adjustable from a nearly vertical position up to an angle of about 15° relative to the ambulance wall.

As shown in FIGS. 1 and 2, a pair of position adjusting mechanisms 84 is mounted at opposite edges of backrest 80. Each position adjusting mechanism includes a curved strap 86 pivotally mounted on a wall bracket 88. Each strap 86 includes an elongated slot 90 which receives a handwheel 92 threadably fastened to backrest 80. Each handwheel 92 can be loosened to allow angular adjustment of backrest 80 relative to ambulance wall 32 and then tightened to clamp strap 86 against the backrest to hold it in a fixed position.

Preferably, adjustable safety seat 40 and backrest 80 are installed against the left interior wall of the ambulance so that the emergency medical technician is located on the right side of the patient to perform CPR. This arrangement maintains the aisle area and squad bench area open and allows advanced life support personnel clear access at the left side of the patient. However, if desired, the safety seat and backrest can be installed at the head or left side of the cot.

Preferably, the seat, backrest, support bars and adjustment mechanisms are electrically isolated from the patient cot to allow use of a defibrillator on the patient while the safety seat is occupied. When not required for CPR, the seat may be adjusted to facilitate performance of other medical services.

Where weight or visibility is a design factor, such as in aircraft, cargo netting constructed of fire resistant material stretched over a padded frame may be substituted for the padded backrest described above. However, the netting must be sufficiently tight with free space provided between the netting and the aircraft wall to prevent the emergency medical technician from accidentally striking a hard surface.

The adjustable safety seat of the present invention secures the emergency medical technician in an optimum position to accomplish cardiopulmonary resuscitation and other emergency medical services, relieving him of the necessity of holding on to a grab bar and allowing him to concentrate on his work. To determine the proper adjustment of the safety seat, the emergency medical technician assumes the recommended CPR position at the right side of the patient with his hands on the patient's chest, his elbows straight and his shoulders over the patient's sternum. The position of his buttocks will be naturally determined by what is comfortable. The seat is then adjusted to the height necessary to meet the technician's buttocks and to support his body weight. Thereafter, safety belt 70 is fastened across his pelvis.

With the emergency medical technician secured in the CPR position by belt 70 and the patient secured by standard cot straps, the technician and patient will remain locked in the same positional relationship. The emergency medical technician can then control his upper body to such a degree that both manual CPR compressions and ventilations can be performed virtually without interruption no matter how the vehicle moves. The safety seat allows the technician to perform mouth-to-mouth ventilation or to use adjunct equipment, such as a bag mask or a demand valve, to ventilate the patient.

In conclusion, the adjustable safety seat of this invention enhances the ability of an emergency medical technician to provide basic life support services in a moving ambulance or other emergency vehicle. The adjustable safety seat and restraint securely hold the technician in place, while the ambulance is in motion, to enable him to perform CPR without interruptions, while simultaneously protecting the technician from falls and possible injury.

While a specific embodiment of the invention has been shown and described in detail, it will be understood that the invention may be modified without departing from the spirit of the inventive principles as set forth in the appended claims.

I claim:

1. An adjustable safety seat for use in the patient compartment of an emergency vehicle to firmly support a medical attendant performing emergency medical services on a patient, comprising:
    a pair of spaced, vertical support bars mounted adjacent to an interior wall in the patient compartment of the vehicle;
    a seat member extending horizontally between said support bars and slidably mounted thereon for adjustment between different vertical positions;
    means for locking said seat member on said support bars in its different vertical positions;
    an adjustable backrest mounted on the interior wall of the vehicle and extending above said seat member to protect the medical attendant from injury during motion of the vehicle
    said backrest being pivotally mounted on the interior wall of the vehicle and adjustable between different angular positions relative thereto; and
    restraining means for securely holding the medical attendant against said seat member to permit him to safely perform emergency medical services on the patient while the vehicle is in motion.

2. The adjustable safety seat of claim 1, wherein: said seat member includes a pair of sleeve elements mounted at its opposite ends and adapted to slidably receive said support bars.

3. The adjustable safety seat of claim 2, wherein: each of said support bars includes upper and lower arms secured to the interior wall of the vehicle.

4. The adjustable safety seat of claim 2, wherein: each of said support bars has its lower end secured to the floor in the patient compartment of the vehicle and includes an arm at its upper end fastened to the interior wall of the vehicle.

5. The adjustable safety seat of claim 1, wherein said seat member is elongated and cylindrical in configuration.

6. The adjustable safety seat of claim 5, wherein said seat member is padded.

7. The adjustable safety seat of claim 1, wherein said restraining means comprises a lap belt secured to the interior wall behind said seat member.

8. The adjustable safety seat of claim 1, wherein said seat member is adjustable to a height suitable to support the attendant in a crouch with his knees bent and his buttocks at rest thereon and with his arms and elbows straight and his hands on the chest of the patient to permit him to safely and effectively perform cardiopulmonary resuscitation on the patient.

9. An adjustable safety seat for use in the patient compartment of an emergency vehicle to firmly support a medical attendant performing emergency medical services on a patient, comprising:
    a pair of spaced, vertical support bars mounted adjacent to an interior wall in the patient compartment of the vehicle;
    an elongated seat member cylindrical in configuration extending horizontally between said support bars and slidably mounted thereon for adjustment between different vertical positions;
    means for locking said seat member on said support bars in its different vertical positions; and
    restraining means for securely holding the pelvis of the medical attendant against said seat member to permit him to safely perform emergency medical services on the patient while the vehicle is in motion.

10. The adjustable safety seat of claim 9, wherein: said seat member includes a pair of sleeve elements mounted at its opposite ends and adapted to slidably receive said support bars.

11. The adjustable safety seat of claim 10, wherein: each of said support bars includes upper and lower arms secured to the interor wall of the vehicle.

12. The adjustable safety seat of claim 10, wherein: each of said support bars has its lower end secured to the floor in the patient compartment of the vehicle and includes an arm at its upper end fastened to the interior wall of the vehicle.

13. The adjustable safety seat of claim 9, which includes:
    an adjustable backrest mounted on the interior wall of the vehicle and extending above said seat member to protect the medical attendant from injury during motion of the vehicle.

14. The adjustable safety seat of claim 13, wherein: said backrest is pivotally mounted on the interior wall of the vehicle and is adjustable between different angular positions relative thereto.

15. The adjustable safety seat of claim 9, wherein said seat member is padded.

16. The adjustable safety seat of claim 11, wherein said restraining means comprises a lap belt secured to the interior wall behind said seat member.

17. The adjustable safety seat of claim 9, wherein said seat member is adjustable to a height suitable to support the attendant in a crouch with his knees bent and his buttocks at rest thereon and with his arms and elbows straight and his hands on the chest of the patient to permit him to safely and effectively perform cardiopulmonary resuscitation on the patient.

* * * * *